US010567732B2

(12) United States Patent
Wolf et al.

(10) Patent No.: US 10,567,732 B2
(45) Date of Patent: Feb. 18, 2020

(54) METHOD AND DEVICE FOR STEREOSCOPIC VISION

(71) Applicant: ROBOTEMI, LTD., Tel Aviv (IL)

(72) Inventors: Yosef Arie Wolf, Tel Aviv (IL); Gal Goren, Beit Oren (IL); Efraim Vitzrabin, Holon (IL); Gil Gilad, Haifa (IL)

(73) Assignee: ROBOTEMI LTD, Tel Aviv (IL)

( * ) Notice: Subject to any disclaimer, the term of this patent is extended or adjusted under 35 U.S.C. 154(b) by 0 days.

(21) Appl. No.: 15/889,548

(22) Filed: Feb. 6, 2018

(65) Prior Publication Data

US 2018/0227564 A1 Aug. 9, 2018

Related U.S. Application Data

(60) Provisional application No. 62/454,970, filed on Feb. 6, 2017.

(51) Int. Cl.
| | |
|---|---|
| *H04N 13/122* | (2018.01) |
| *H04N 13/204* | (2018.01) |
| *H04N 13/15* | (2018.01) |
| *H04N 5/33* | (2006.01) |
| *H04N 13/254* | (2018.01) |
| *H04N 13/00* | (2018.01) |

(52) U.S. Cl.
CPC ............. *H04N 13/15* (2018.05); *H04N 5/332* (2013.01); *H04N 13/254* (2018.05); *H04N 2013/0081* (2013.01)

(58) Field of Classification Search
CPC .... H04N 13/15; H04N 13/239; H04N 13/271; H04N 13/254; H04N 5/332; H04N 2013/0081
See application file for complete search history.

(56) References Cited

U.S. PATENT DOCUMENTS

| | | | | |
|---|---|---|---|---|
| 4,837,478 | A * | 6/1989 | Anzai | G08B 13/194 313/112 |
| 7,259,357 | B2 * | 8/2007 | Walker | B60R 25/02 156/308.4 |
| 8,693,731 | B2 * | 4/2014 | Holz | H04N 5/232 382/103 |
| 8,917,169 | B2 * | 12/2014 | Schofield | B60N 2/002 340/425.5 |

(Continued)

*Primary Examiner* — Philip P. Dang
(74) *Attorney, Agent, or Firm* — The Roy Gross Law Firm, LLC; Roy Gross

(57) ABSTRACT

A stereoscopic vision device, a method and a robot, the stereoscopic vision device comprising: a first image capture device and a second image capture device configured to capture a light pattern formed in an environment of the device by a light source configured to emit NIR light at a multiplicity of directions, each of the first image capture device and the second image capture device comprising a filter configured to transmit at least 75 percent of the NIR light, and to transmit at most 50 percent of visible light; and a processor configured to: determine depth information of the environment from a first image captured by the first image capture device and a second image captured by the second image capture device, based on the light pattern as depicted in the first image and the second image; and determine color information of the environment the first image and the second image.

15 Claims, 4 Drawing Sheets

(56) References Cited

U.S. PATENT DOCUMENTS

| | | | | |
|---|---|---|---|---|
| 9,813,151 B2* | 11/2017 | Kingsbury | ............ | H04B 10/118 |
| 9,904,859 B2* | 2/2018 | Grauer | ................. | G01S 17/107 |
| 9,958,576 B2* | 5/2018 | Kawashima | ............. | G02B 5/22 |
| 10,004,651 B2* | 6/2018 | DeLuca | ................ | A61G 1/0243 |
| 10,116,915 B2* | 10/2018 | Mogalapalli | ............ | G06T 7/521 |
| 10,203,762 B2* | 2/2019 | Bradski | ................ | G02B 27/225 |
| 2011/0187820 A1* | 8/2011 | Gilboa | ................ | H04N 13/139 |
| | | | | 348/43 |
| 2011/0222757 A1 | 9/2011 | Yeatman, Jr. et al. | | |
| 2011/0234481 A1* | 9/2011 | Katz | ........................ | H04N 9/31 |
| | | | | 345/156 |
| 2012/0242795 A1* | 9/2012 | Kane | ................ | G01B 11/2513 |
| | | | | 348/46 |
| 2013/0235165 A1* | 9/2013 | Gharib | ................ | H04N 13/214 |
| | | | | 348/50 |
| 2014/0184748 A1* | 7/2014 | Gharib | ................ | G02B 3/0056 |
| | | | | 348/46 |
| 2015/0301690 A1* | 10/2015 | Masuda | ............... | H04N 13/254 |
| | | | | 345/175 |
| 2016/0044298 A1* | 2/2016 | Holz | ...................... | H04N 5/332 |
| | | | | 348/47 |
| 2016/0171597 A1* | 6/2016 | Todeschini | ......... | G06Q 30/0623 |
| | | | | 705/26.61 |
| 2017/0231544 A1* | 8/2017 | Satoi | ................ | A61B 5/02108 |
| | | | | 600/479 |

\* cited by examiner

METHOD AND DEVICE FOR STEREOSCOPIC VISION

BACKGROUND

The invention relates to the field of stereoscopic vision devices.

Stereoscopic vision is required and used in a multiplicity of applications, including but not limited to determining three-dimensional (3D) information in an environment for automatically navigating a robot therein. The task is particularly complex in an indoor or another environment in which the robot is surrounded by multiple static or dynamic objects at various and changing distances from the robot.

In order to obtain three-dimensional information of an environment, some systems use a pair of cameras whose fields of view (FOVs) have part or full overlap. Depth information may be obtained by registering the two images, comprising identifying one or more objects or locations appearing in the two images, and deducing depth information from their respective locations, size, orientation or other parameters.

The foregoing examples of the related art and limitations related therewith are intended to be illustrative and not exclusive. Other limitations of the related art may become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment a stereoscopic vision device, comprising: a first image capture device and a second image capture device configured to capture a light pattern formed in an environment of the device by a light source configured to emit near infrared (NIR) light at a multiplicity of directions, each of the first image capture device and the second image capture device comprising a filter configured to transmit at least 75 percent of the NIR light, and to transmit at most 50 percent of visible light; and a processor configured to: determine depth information of the environment from a first image captured by the first image capture device and a second image captured by the second image capture device, using the light pattern as captured in the first image and the second image; and determine color information of the environment the first image and the second image. Within the device, the filter is optionally configured to transmit at least 85 percent of the NIR light. Within the device, the filter is optionally configured to transmit at most 40 percent of the visible light.

There is provided, in accordance with another embodiment a method for obtaining stereoscopic data of an environment, comprising: emitting NIR light at a multiplicity of directions, thus forming a light pattern in the environment; obtaining a first image captured by a first image capture device and a second image captured by a second capture device, the first image and the second image depicting at least a part of the light pattern, wherein each of the first image capture device and the second image capture device capture the first image and the second image, respectively, through a filter configured to transmit at least 75 percent of the NIR light, and to transmit at most 50 percent of visible light; identifying the light pattern in the first image and in the second image; registering the first image and the second image in accordance with the light pattern; determining depth information for each light point comprised in the light pattern; and determining color information of the environment from the first image and in the second image. Within the method the filter is optionally configured to transmit at least 85 percent of the NIR light. Within the method, the filter is optionally configured to transmit at most 40 percent of the visible light. Within the method, the depth information is optionally determined by comparing locations of points in the light pattern as captured in the first image and in the second image.

There is provided, in accordance with yet another embodiment a robot comprising: a light source configured to emit a pattern of NIR light at a multiplicity of directions, thus forming a light pattern in an environment of the robot; a first image capture device and a second image capture device, each comprising a filter configured to transmit at least 75 percent of the NIR light, and to transmit at most 50 percent of visible light, the first image capture device and a second image capture device configured to capture at least a part of the light pattern; and a processor configured to: determine depth information in the environment from a first image captured by the first image capture device and a second image captured by the second image capture device, using the at least part of the light pattern as captured in the first image and the second image; and determine color information of at least one object from the first image and the second image; a steering mechanism or changing a position of the robot in accordance with the at least one object; and a motor for activating the steering mechanism. Within the robot, the filter is configured to transmit at least 85 percent of the NIR light. Within the robot, the filter is optionally configured to transmit at most 40 percent of the visible light. Within the robot, the depth information is optionally determined by comparing locations of points in the light pattern as captured in the first image and in the second image.

In addition to the exemplary aspects and embodiments described above, further aspects and embodiments may become apparent by reference to the figures and by study of the following detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods, systems, and/or materials are described below. In case of conflict, the patent specification, including definitions, will control. In addition, the materials, methods, and examples are illustrative only and are not intended to be necessarily limiting.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
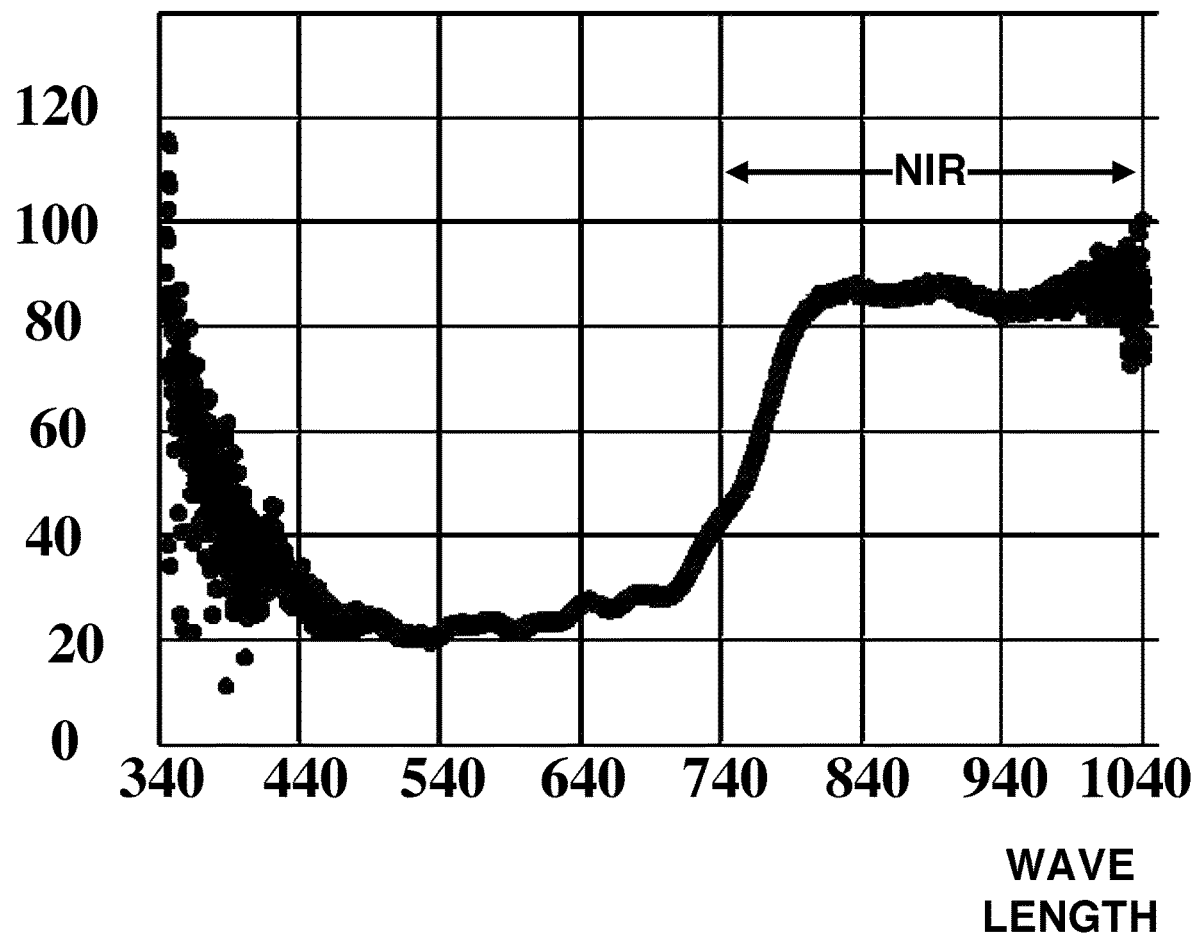
FIG. 1 shows a schematic exemplary illustration of experimental wavelength transmittance of a filter for different wavelengths, in accordance with an example of the presently disclosed subject matter.

One technical problem handled by the disclosed subject matter relates to a need for a system and method for stereoscopic vision.

Another technical problem handled by the disclosed subject matter relates to a system and method for navigating in an area wherein static or mobile objects are to be regarded, e.g., tracked, led, or avoided.

Stereoscopic vision and navigating upon stereoscopic vision is generally done by capturing at least two corresponding images taken at slightly different angles, and registering the images based upon features or objects appearing in the two images.

However, in some situations, no or insufficient features may be identified for registering the two images. In order to overcome such situations, known techniques include the projection of a multiplicity, such as between ten and tens of thousands or even more, points or other shapes in the Near Infrared (NIR) wavelength range. The points may be projected by a laser emitter combined with a diffractive optical element (DOE), with a predetermined pattern, or any random pattern. For example, the light points are projected in multiple directions, such as simultaneously with a static multifaceted lens, serially with a dynamic rotating lens, and/or the like. By identifying corresponding patterns in the two images, the images may be registered. By using cameras with lenses that are sensitive to NIR wavelengths, the points may be detected without interfering humans in the environment. However, differentiating the points from their surroundings is difficult since the color component reflected by objects is usually more dominant than the NIR component. In order to overcome this, a filter is typically used with such cameras, which filters the visible light range and passes only the NIR range. Then, since it is still required to obtain color information in order to receive more information about the environment for algorithms such as tracking, leading, avoiding obstacles and differentiate between objects, a third camera may be added to the system, for capturing color information for every depth point identified by the two cameras capturing only the NIR points. Examples to such 3-camera combinations include the Intel® Realsense® r200 camera, provided by Intel Corporation® of Santa Clara, Calif.

This approach has a number of deficiencies, for example: A. The cost of a third camera, and the increase in the device size due to the usage of three cameras. B. the extra burden of registration between the depth cameras and the color camera, which implies registration between three systems. Moreover, this registration needs to be done in real time, and for each depth point. C. Some materials, for example certain fabrics absorb the NIR wavelength range, such that depth cameras do not identify objects or features of these fabrics and may not provide depth information for them. The color camera, on the other hand, only provides color information for the spots identified by the depth cameras, and thus may not recognize such objects either. For example, a person wearing cloth of such fabric may not be identified and information may not be available regarding the person's presence at the scene.

One technical solution provided by the disclosure is the provisioning of a two-camera set, wherein each camera is equipped with a filter that passes all or a significant part of the NIR light, and blocks significant parts, but not all, of the visible wavelengths. For example, the filter may have a transmission rate of about 10-40% in the range of 400-650 nm, and a transmission rate of at least about 85% for wave lengths in the vicinity of 850 nm, which may be used by some laser sources. It may be appreciated by people skilled in the art that different transmission may be used for each wavelength, but as long as higher transmittance rate is provided for the NIR wavelengths than for visible light.

Referring now to FIG. 1, showing measurements of the transmittance rate taken with an exemplary filter manufactured in accordance with the disclosure, for which the required transmittance rate for light of wavelength 400-650 nm was defined to be 20%, and the required transmittance rate for light of wavelength of about 850 nm was defined to be 90%. IT is seen that some wave lengths have multiple measurements. However, all measurements for the wavelengths exceeding about 400 nm and below 740 nm are below 40%, and for wavelengths exceeding about 450 nm and below about 700 are below about 30%, and thus deviate in up to about 8% from the definition. Thus, the exemplary measurements, which were taken upon an actual filter show that the filter filters out most of the visible light, and transmits most of the NIR light. The exemplary measurements were taken in situations in which satisfactory results were obtained for identifying objects in a manner that enables navigation in the environment.

It may be appreciated that the shown measurements are exemplary only, and variations in the transmittance degrees may occur, however, significant part of the NIR light is transmitted, and significant part of the visible colors is partially but not fully blocked, such that color information is still available.

A system having two cameras with filters as disclosed above provides for the projected point pattern being noticeable, thus enabling the registration between the patterns in the two cameras, and reconstruction of the depth information. The depth information may comprise, for example, the distance at which the nearest object is found at each particular angle, thus mapping the available space in the vicinity of the system. On the other hand, color information is available and is sufficient for tracking objects, including objects that absorb the NIR radiation and therefore no depth information is obtained for them. In some embodiments, such as navigating a robot, it is not required to display to a human the environment as captured, thus the color quality is not of particular importance beyond the ability to differentiate and track objects.

Figure 2:
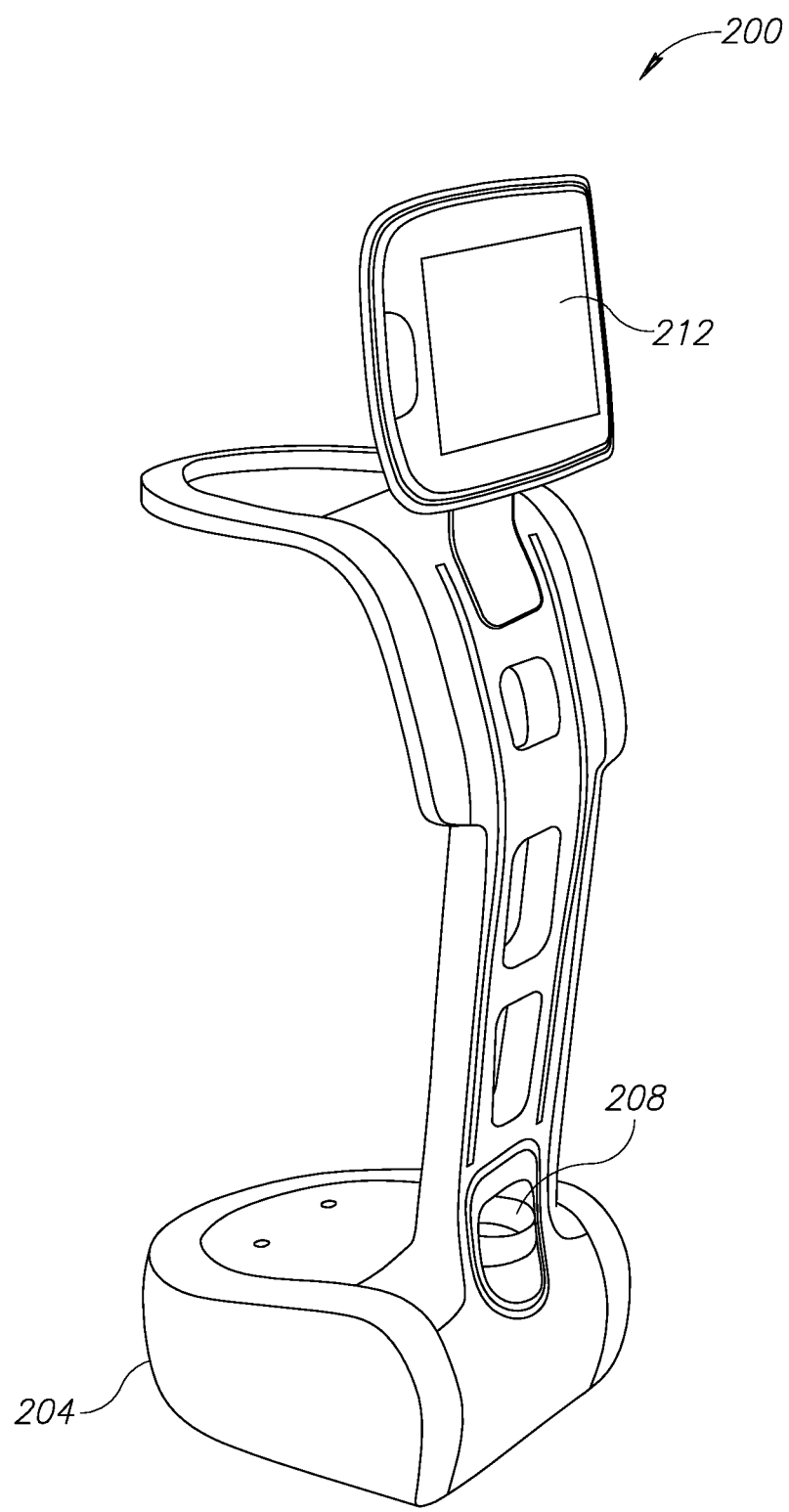
FIG. 2 shows a schematic illustration of a mobile device comprising a stereoscopic vision device, in accordance with an example of the presently disclosed subject matter.
Figure 3:
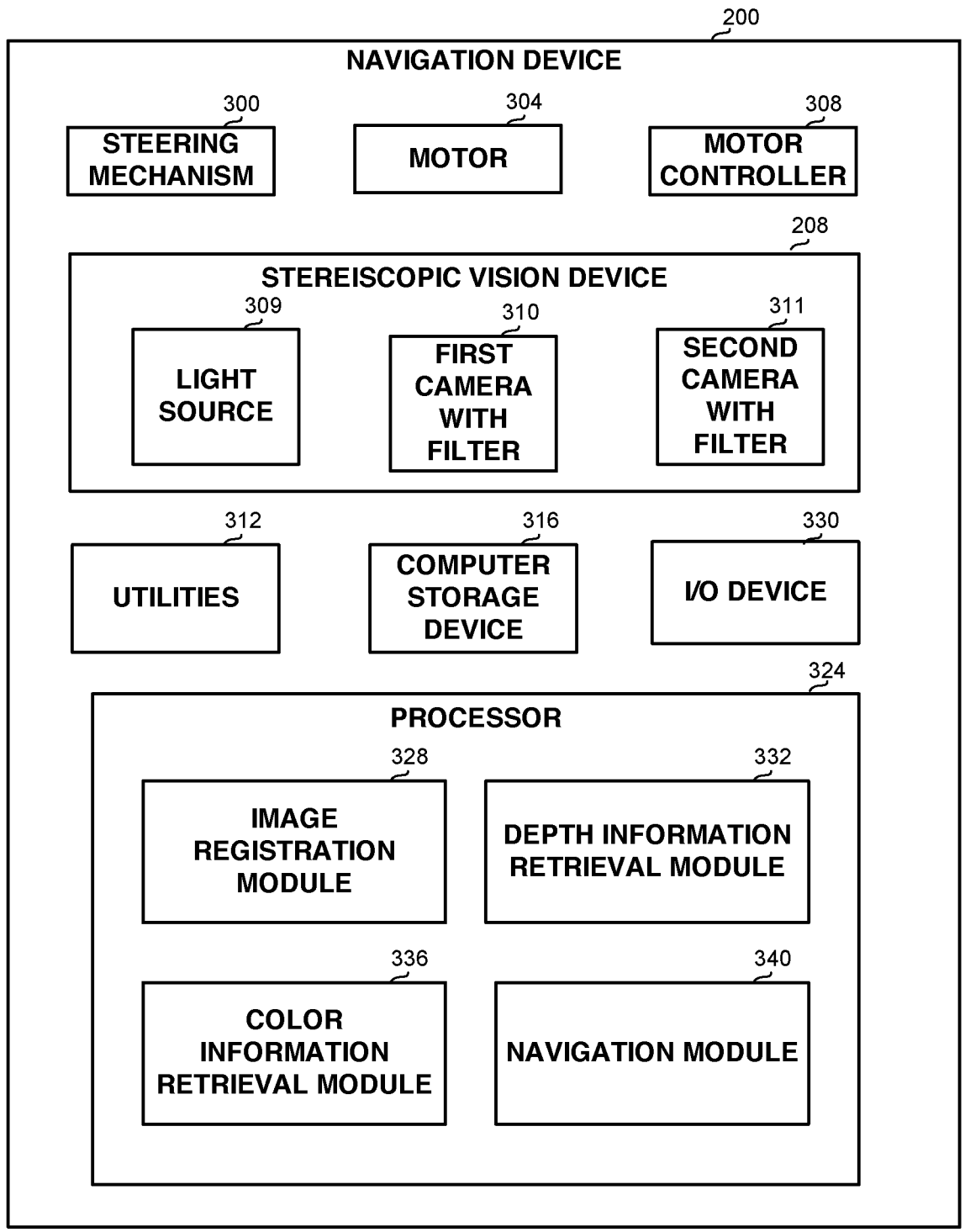
FIG. 3 shows a functional block diagram of a mobile device using a light source and two cameras, in accordance with an example of the presently disclosed subject matter.

Referring now to FIG. 2, showing an illustration of a mobile device, such as a robot, comprising a stereoscopic vision device navigating in accordance with the disclosed stereoscopic vision device, and to FIG. 3, showing a functional block diagram of the same.

The mobile device, generally referenced 200, comprises a steering mechanism 300 (not shown in FIG. 2) which may be located at its bottom part 204, and comprising one or more wheels or one or more bearings, chains or any other mechanism for moving. Device 200 may also comprise motor 304 for activating steering mechanism 300, and motor controller 308 for providing commands to motor 304 in accordance with the required motion.

Mobile device 200 may further comprise one or more stereoscopic vision device 208, enabling stereoscopic vision. Stereoscopic vision device 208 may include light source 309, such as a laser emitter emitting light at NIR wavelength, a first camera 310 and a second camera 311, each camera comprising a filter such as the filter described in association with FIG. 1 above. Stereoscopic vision device 208 may also comprise a processor as described below in association with processor 324.

In some embodiments, stereoscopic vision device 208 may rotate, for example at a rate of 120 RPM, such that at least 120 times every minute objects surrounding the device may be captured and analyzed.

Mobile device 200 may further comprise utilities 312 such as a tray or a handle, a display device 212, or the like.

Display device 212 may display a part of the environment as captured by cameras 308 and 309 to a user or another person, thus giving a feeling that a human instructor is leading or following the user. Display device may also display alerts, entertainment information, required information such as items to carry, or any other information. Utilities 312 may also comprise a speaker for playing or streaming sound, a basket, or the like Mobile device 200 may further comprise one or more computer storage devices 316 for storing data or program code operative to cause mobile device 200 to perform acts associated with any of the steps of the methods detailed below or with any other steps related for example to navigation of the robot. Storage device 316 may be persistent or volatile. For example, storage device 316 may be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like.

In some exemplary embodiments of the disclosed subject matter, mobile device 200 may comprise one or more Input/Output (I/O) devices 320, which may be utilized to receive input or provide output to and from mobile device 200, such as receiving commands, displaying instructions, or the like. I/O device 320 may include previously mentioned members, such as display 212, speaker, microphone, a touch screen, or others.

In some exemplary embodiments, mobile device 200 may comprise one or more processors 324. Each processor 324 may be a Central Processing Unit (CPU), a microprocessor, an electronic circuit, an Integrated Circuit (IC) or the like. Alternatively, processor 324 may be implemented as firmware programmed for or ported to a specific processor such as digital signal processor (DSP) and/or microcontrollers, or may be implemented as hardware or configurable hardware such as field programmable gate array (FPGA) or application specific integrated circuit (ASIC).

In some embodiments, one or more processor(s) 324 may be located remotely from mobile device 200, such that some or all the computations are performed remotely from the device and the results are transmitted via a communication channel to mobile device 200.

It may be appreciated that processor(s) 324 may be configured to execute several functional modules in accordance with computer-readable instructions implemented on a non-transitory computer-readable storage medium, such as but not limited to storage device 316. Such functional modules are referred to hereinafter as comprised in the processor.

The components detailed below may be implemented as one or more sets of interrelated computer instructions, executed for example by processor 324 or by another processor. For example, components related to images or captured by stereoscopic vision device 208 may be executed by a processor associated with stereoscopic vision device 108. The components may be arranged as one or more executable files, dynamic libraries, static libraries, methods, functions, services, or the like, programmed in any programming language and under any computing environment.

Processor 324 may comprise image registration module 328, for receiving two images captured by first capture device 309 and second capture device 310, both comprising filters as disclosed above. Each of the images represents a multiplicity of light points, and the registration between the images may be determined by matching corresponding light patterns. It may be appreciated that since the cameras are at constant position relative to each other, no ongoing registration is required, rather registration may be performed on a preparation stage, at certain times, intervals or upon specific events.

Processor 324 may comprise depth information retrieval module 332 for retrieving depth information for each point identified in the two images, thus producing depth information. By capturing images around the device, the full environment may be mapped.

Processor 324 may comprise color information retrieval module 336 for retrieving color information and differentiating objects based on color differences. The depth information determined by depth information retrieval module 332, together with the color retrieved by color information retrieval module 236 may provide enough data for navigating so as to follow or lead an object such as a person, avoid objects such as furniture, or the like. It may be appreciated that objects having patterns that absorb the IR wavelengths may still be differentiated based on their color information, since color retrieval is not limited to points for which depth information is available.

Processor 324 may comprise navigation module 340 for navigating within the environment, based on the gathered object information.

It may be appreciated that using a stereoscopic vision device achieves a multiplicity of advantages over traditional solutions. The device comprises two cameras, thus saving the additional cost and additional place required for a third camera. By the two cameras capturing objects with the same transmittance graph, it is not required to register between cameras capturing objects in different manners. Employing only two cameras implies a more efficient process as only one registration is required, and also avoids error accumulation caused by multiple registrations. In some embodiments, the registration may be performed offline, thus saving computing resources on an ongoing basis.

Due to the color sensitivity of the cameras, even objects made of material that absorbs NIR radiation may be detected and tracked, since the color recognition and thus object separation is independent of the depth information, unlike traditional systems in which color information is only obtained for points for which depth information is obtained by the NIR recognition. Thus, a stereoscopic vision device in accordance with the disclosure avoids gaps in the description of the environment.

Figure 4:
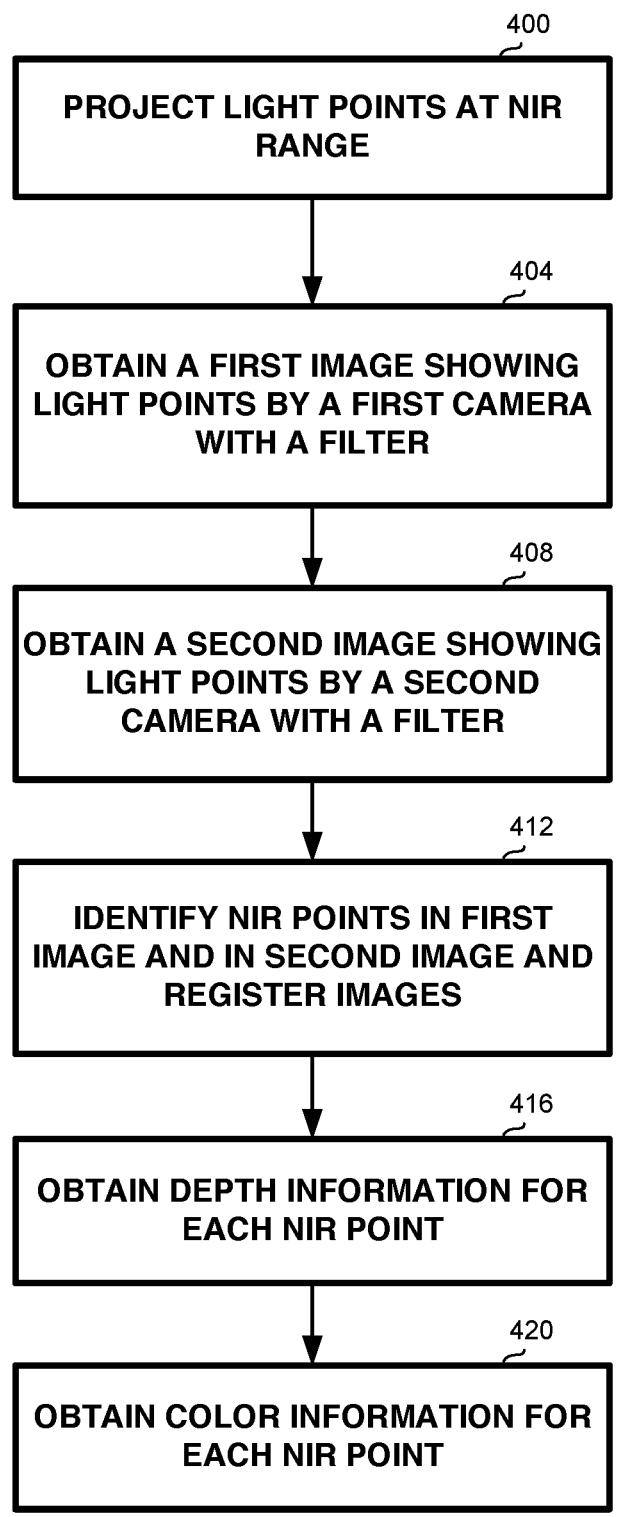
FIG. 4 is a flowchart of operations carried out for obtaining stereoscopic vision of the environment by a device using a light source and two cameras, in accordance with an example of the presently disclosed subject matter.

Referring now to FIG. 4, showing a flowchart of operations carried out for obtaining stereoscopic vision of an environment, in accordance with some embodiments of the disclosure At step 400, a multiplicity of light points, at a frequency within the NIR wavelength range may be projected by a light source in the environment of the device.

At step 404, a first image showing the light points and captured by a first camera, with a filter such as the filter disclosed above may be obtained.

At step 408, a second image showing the light points and captured by a second camera, with a filter such as the filter disclosed above may be obtained.

At step 412, the NIR points may be identified in the first and the second image. If no valid registration is available for the cameras, registration may be performed by matching corresponding patterns formed by the light points. It may be appreciated that since the cameras are fixed relatively to each other, registration need not be performed for each pair of images but only when the setup changes or upon specific demand.

At step 416 depth information may be determined for each light point from the difference in the location of each point between the two images.

At step 420, color information may be obtained from the images. Although the colors in the images is different than it would seem to a human user, due to the changes caused by the low and non-uniform transmittance rate of the filter across the visible spectrum, the color does enable differentiation between objects, including objects that absorb the NIR radiation to some degree. The differentiation enables tracking of the objects between consecutive images of the area of each such object.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A stereoscopic vision device, comprising:
a first near infrared (NIR) image capture device and a second NIR image capture device each configured to capture a NIR light pattern formed in an environment of the devices by a light source configured to emit near infrared (NIR) light at a multiplicity of directions, each of the first NIR image capture device and the second NIR image capture device comprising a filter configured to transmit at least 75 percent of the NIR light in a NIR wavelength of at least 850 nanometers, and to transmit at least part of and at most 50 percent of visible light; and
a processor configured to:
determine depth information of the environment from a first image captured by the first NIR image capture device and a second image captured by the second NIR image capture device, based on the NIR light pattern depicted in the first image and the second image, wherein the depth information is determined by comparing locations of points in the NIR light pattern as captured in the first image and in the second image; and
determine color information of the environment based on the transmitted visible light,
wherein the filter is configured to transmit between 10 and 40 percent of the visible light at a wavelength range of 400-650 nanometers.

2. The device of claim 1, wherein the NIR light has a wavelength of at least 850 nanometers.

3. The device of claim 1, wherein the visible light has a wavelength range of 400-650 nanometers.

4. The device of claim 1, wherein the filter is configured to transmit at least 85 percent of the NIR light at a wavelength of at least 850 nanometers.

5. The device of claim 1, further comprising the light source configured to emit near infrared (NIR) light at the multiplicity of directions.

6. The device of claim 1, wherein the multiplicity of directions comprise selectively emitting the NIR light in the NIR light pattern.

7. The device of claim 1, wherein the depth information is determined by (i) identifying the NIR light pattern depicted in the first image and in the second image, and (ii) registration of the NIR light pattern depicted in the first image with the NIR light pattern depicted in the second image.

8. A method for obtaining stereoscopic data of an environment, comprising:
emitting near infrared (NIR) light at a multiplicity of directions, thus forming a NIR light pattern in the environment;
obtaining a first image captured by a first NIR image capture device and a second image captured by a second NIR capture device, the first image and the second image each depicting at least a part of the NIR light pattern,
wherein each of the first NIR image capture device and the second NIR image capture device capture the first image and the second image, respectively, through a filter configured to transmit at least 75 percent of the NIR light, and to transmit at least part of and at most 50 percent of visible light;
identifying the NIR light pattern depicted in each of the first image and the second image;
registering the first image and the second image in accordance with the NIR light pattern;
determining depth information for each light point comprised in the NIR light pattern depicted in the registered first and second images, wherein the depth information is determined by comparing locations of points in the NIR light pattern as depicted in the first image and in the second image; and determining color information of the environment based on the transmitted visible light,
wherein the filter is configured to transmit between 10 and 40 percent of the visible light at a wavelength range of 400-650 nanometers.

9. The method of claim 8, wherein the NIR light has a wavelength of at least 850 nanometers.

10. The method of claim 8, wherein the visible light has a wavelength range of 400-650 nanometers.

11. The method of claim 8, wherein the filter is configured to transmit at least 85 percent of the NIR light at a wavelength of at least 850 nanometers.

12. The method of claim 8, wherein the multiplicity of directions comprise selectively emitting the NIR light in the NIR light pattern.

13. A robot comprising:
a light source configured to emit a pattern of near infrared (NIR) light at a multiplicity of directions, thus forming a NIR light pattern in an environment of the robot;
a first NIR image capture device and a second NIR image capture device, each comprising a filter configured to transmit at least 75 percent of the NIR light, and to transmit at least part of and at most 50 percent of visible light, the first NIR image capture device and the second NIR image capture device configured to each capture at least a part of the NIR light pattern, wherein the filter is configured to transmit between 10 and 40 percent of the visible light at a wavelength range of 400-650 nanometers; and
a processor configured to:
determine depth information of the environment from a first image captured by the first NIR image capture device and a second image captured by the second NIR image capture device, based on the at least part of the NIR light pattern as depicted in each of the first image and the second image, wherein the depth information is determined by comparing locations of points in the NIR light pattern as depicted in the first image and in the second image; and
determine color information of at least one object from the first image and the second image based on the transmitted visible light;
a steering mechanism or changing a position of the robot in accordance with the at least one object; and
a motor for activating the steering mechanism.

14. The robot of claim 13, wherein the filter is configured to transmit at least 85 percent of the NIR light at a wavelength of at least 850 nanometers.

15. The robot of claim 13, wherein the depth information is determined by (i) identifying the NIR light pattern in each of the first image and the second image, and (ii) registration of the NIR light pattern depicted in the first image with the NIR light pattern depicted in the second image.

* * * * *